Patented Sept. 14, 1943

2,329,432

UNITED STATES PATENT OFFICE 2,329,432

CYCLIC-KETONIC TETRACARBOXYLIC ACID

Herman A. Bruson, Philadelphia, Pa., assignor to The Resinous Products & Chemical Company, Philadelphia, Pa., a corporation of Delaware No Drawing. Application October 11, 1941,
Serial No. 414,600

6 Claims. (Cl. 260—514)

This invention relates to delta-ketonic tetracarboxylic acids having the formula:

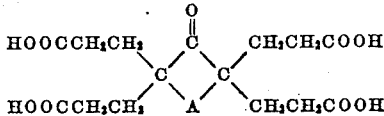

wherein A is an alkylene radical having at least two carbon atoms in the alkylene group, and to a process for their preparation.

This application is a continuation-in-part of my copending applications Serial No. 389,332, filed April 19, 1941, and Serial No. 397,865, filed June 13, 1941.

These acids are new compounds which are useful in the preparation of resins of the alkyd or Nylon type. In the form of their esters they are useful as plasticizers for such plastics as nitrocellulose, ethyl cellulose, other cellulose esters, as well as other plastic or resinous products and coatings.

According to this invention, delta-ketonic tetracarboxylic acids of the above formula are obtained by hydrolyzing the reaction products obtained by condensing acrylonitrile in the presence of an alkaline condensing agent with an alicyclic ketone having the formula:

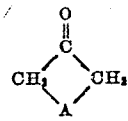

wherein A has the above-mentioned significance.

The preparation of the said reaction products is described in detail in application Serial No. 397,865. According to the method disclosed therein, an alicyclic ketone having a reactive methylene group on each side of the carbonyl group is reacted in the presence of an alkaline condensing agent with four mols of acrylonitrile to form a tetra-(ω-cyanoethyl) derivative of the cyclic ketone. Typical alicyclic ketones which may be reacted include cyclopentanone, cyclohexanone, cycloheptanone and homologues or substitution products thereof which still possess two active methylene groups adjacent the carbonyl group.

Among the alkaline condensing agents which are effective for promoting this reaction are the oxides, hydroxides, hydrides, amides, and alcoholates of the alkali metals, or the alkali metals themselves. There may also be used strongly basic non-metallic hydroxides, for example, quaternary ammonium hydroxides. Of these, a particularly effective condensing agent is the aqueous solution containing 40% of trimethyl benzyl ammonium hydroxide which is commercially available under the trade name "Triton B." The quantity of alkaline condensing agent required is relatively small, amounts of the order of 1% to 10% on the combined weight of reactants usually being sufficient. One or several of these alkaline materials are suspended or, preferably, dissolved in the reactive alicyclic ketone itself or in a solution thereof in an inert liquid such as dioxane, ether, benzene, or in a liquid which is less reactive than the reacting components, such as water or tertiary butyl alcohol. The condensation takes place readily at temperatures from about 0° to about 80° C., although initial temperatures of 25° C. to 60° C. are preferred. The condensation is usually exothermal so that cooling, at least during the early part of the reaction, is generally advantageous in order to control the vigor of the reaction and to prevent undesired polymerization or side reactions. After the reaction is completed, the condensation product may be isolated and purified or it may be utilized in crude form for the hydrolysis.

Hydrolysis is carried out by heating the condensation product with water in the presence of a hydrolytic agent until ammonia has been eliminated. For this purpose there may be used a solution of an alkali such as sodium hydroxide or potassium hydroxide or of an aqueous non-oxidizing mineral acid, such as hydrochloric or sulfuric acid. The alkalies, however, are preferred as they lessen the possibility of lactone formation. Temperatures at about the boiling point of water are generally suitable, but higher temperatures may be used when the hydrolysis is performed under pressure.

The following examples illustrate this invention:

Example 1

A mixture consisting of 200 cc. of water, 20 g. of sodium hydroxide and 30 g. of the 2,5-tetra-ω-cyanoethylation product of cyclopentanone melting at 175° C. (obtained by condensing cyclopentanone with four mols of acrylonitrile in alkaline solution) was stirred and boiled under reflux for four hours. The clear, amber solution was treated with charcoal, filtered, and acidified with concentrated hydrochloric acid. The clear solution obtained was evaporated to about one-third of its original volume, then cooled, and the crystalline product filtered off in a yield of 27 g. Upon recrystallization from water, the product formed colorless crystals melting at 173° C., having the formula:

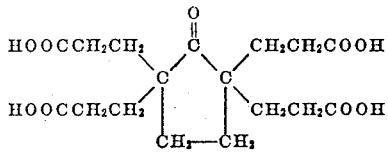

Example 2

A mixture consisting of 1900 g. of water, 196 g. of potassium hydroxide and 217 g. of the 2,6-tetra-ω-cyanoethylation product of cyclohexanone melting at 165° C. (obtained by condensing cyclohexanone with four mols of acrylonitrile in the presence of trimethyl benzyl ammonium hydroxide as a catalyst) was stirred and boiled under reflux for four hours. The clear solution obtained was acidified with 350 g. of concentrated hydrochloric acid and cooled at 15-20° C., whereupon the product crystallized. It was filtered off and washed with a little ice water. The yield was 199 g. of air-dried white crystals. Upon recrystallization from boiling water, the compound formed colorless needles melting at 179-180° C., having the formula:

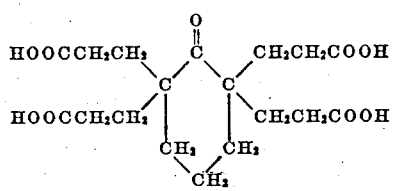

From the original mother liquors an additional 26 g. of product was recovered upon evaporation, giving a total yield of 85% of theoretical.

Example 3

A mixture of 64.8 g. of 2,6-tetra-(ω-cyanoethyl)-4-methyl-cyclohexanone, 200 g. of water and 36 g. of sodium hydroxide was stirred and boiled under reflux for 6½ hours. The clear solution was treated with charcoal, filtered, and the clear solution acidified with concentrated hydrochloric acid. The crystalline precipitate was filtered off and dried to give a yield of 70 g. of white powder. Upon recrystallization from hot water it formed colorless crystals melting at 205-206° C., having the formula:

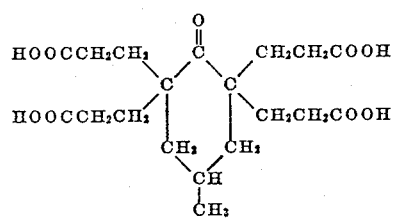

The 2,6-tetra-(ω-cyanoethyl)-4-methyl-cyclohexanone used was a crystalline compound, M. P. 138° C., obtained by condensing p-methyl cyclohexanone in the presence of sodium methylate as a catalyst with four mols of acrylonitrile.

Example 4

A mixture of 38 g. of 2,6-tetra-(ω-cyanoethyl)-4-tertiary-amyl-cyclohexanone, 200 g. of water, 20 g. of sodium hydroxide and 200 cc. of alcohol was boiled under reflux for five hours, then bleached with charcoal and filtered. The filtrate was acidified with hydrochloric acid and the clear solution evaporated to dryness. The residue was washed twice with 100 cc. portions of warm water and then dried. It formed a hard, white mass which, upon recrystallization from hot water, crystallized in fine flakes melting, when pure, at 205° C., and having the formula:

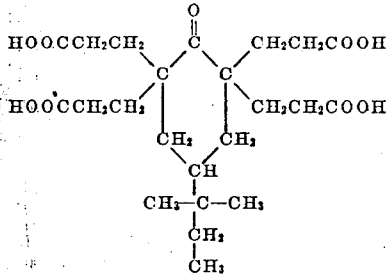

The 2,6-tetra-(ω-cyanoethyl)-4-tertiary-amyl-cyclohexanone used was a crystalline compound melting at 145° C., obtained by condensing p-tertiary-amyl cyclohexanone with four mols of acrylonitrile in the presence of trimethyl benzyl ammonium hydroxide as a catalyst at 30-40° C.

Example 5

A mixture of 20.5 g. of 2,6-tetra-(ω-cyanoethyl)-4-cyclohexyl-cyclohexanone, 185 g. of water, 16 g. of sodium hydroxide and 100 g. of ethanol was stirred rapidly and boiled under reflux for 18 hours until a clear solution was obtained. The solution was bleached with charcoal, filtered, and the clear filtrate evaporated to dryness. The residue was dissolved in 200 cc. of water and acidified in the cold with hydrochloric acid. The product precipitated as a white, taffy-like mass. It was dissolved in hot water and cooled while it was stirred, whereupon it formed a crystalline mass melting at 205-206° C. Upon recrystallization from hot water, the compound formed colorless crystals, M. P. 206° C., having the formula:

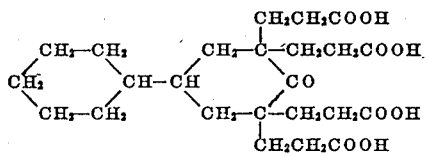

The 2,6-tetra-(ω-cyanoethyl)-4-cyclohexyl-cyclohexanone used was a crystalline compound melting at 223-224° C., obtained by condensing p-cyclohexyl-cyclohexanone with four mols of acrylonitrile in the presence of trimethyl benzyl ammonium hydroxide as a catalyst at 30-40° C.

Although each of the three different tetra-carboxylic acids shown in Examples 3, 4, and 5 melt when pure at 205-206° C., they give large melting point depressions (15-20 centigrade degrees) when any two of them are mixed together, thus showing that the sameness of their melting points is purely a coincidence.

Example 6

A mixture of 24 g. of sodium hydroxide, 200 g. of water, 100 g. of ethanol, and 40 g. of the 2,6-tetra-ω-cyanoethylation product of p-ter-octyl cyclohexanone melting at 155-156° C. was boiled under reflux for 12 hours. The clear solution was treated with bleaching charcoal and filtered. The filtrate was evaporated to dryness, taken up in 200 cc. of water, and acidified with hydrochloric acid. The soft mass which precipitated was dissolved in hot water and allowed to stand in a refrigerator, whereupon the product came down as a white powder. Upon recrystallization from (50-100) dioxane-water mixture, the product formed colorless crystals melting at 185–186° C., having the formula:

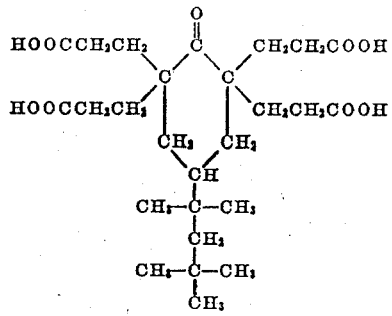

In the same manner one may obtain the corresponding tetra-(ω-carboxy-ethyl) derivatives from p-phenyl-cyclohexanone, p-benzyl-cyclohexanone, p-ter-butyl-cyclohexanone, p-ethyl-cyclohexanone, cycloheptanone, cyclo-octanone, and homologues thereof, by condensing these ketones with four mols of acrylonitrile in the presence of an alkaline condensing agent and hydrolyzing the reaction products obtained.

I claim:

1. A delta-ketonic tetracarboxylic acid having the formula:

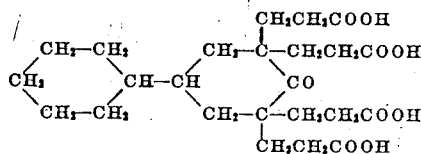

wherein A is a divalent saturated hydrocarbon group having a chain of two to four carbon atoms inclusive in the portion of said group completing the cycle.

2. 2,5 - tetra -(ω - carboxy - ethyl) -cyclopentanone.

3. 2,6-tetra-(ω-carboxy-ethyl)-cyclohexanone.

4. 2,6 - tetra -(ω - carboxy - ethyl) - 4 -methyl-cyclohexanone.

5. A method for preparing delta-ketonic tetracarboxylic acids having the formula

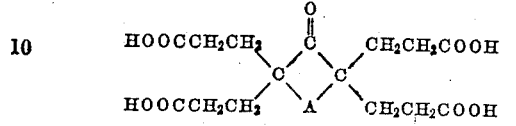

wherein A is a divalent saturated hydrocarbon group having a chain of two to four carbon atoms inclusive in the portion of said group completing the cycle, which comprises hydrolyzing a cyclic ketone having two β-cyanoethyl radicals attached to each of the two carbon atoms contiguous to the carbonyl group of the cycle.

6. A method for preparing delta-ketonic tetracarboxylic acids having the formula:

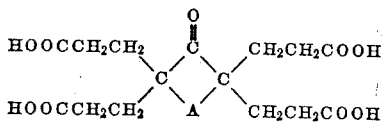

wherein A is a divalent saturated hydrocarbon group having a chain of two to four carbon atoms inclusive in the portion of said group completing the cycle, which comprises hydrolyzing by means of excess aqueous alkali metal hydroxide solution a cyclic ketone having two β-cyanoethyl radicals attached to each of the two carbon atoms contiguous to the carbonyl group of the cycle and acidifying the hydrolysate.

HERMAN A. BRUSON.

Certificate of Correction

Patent No. 2,329,432.  September 14, 1943.

HERMAN A. BRUSON.

It is hereby certified that error appears in the printed specification of the above numbered patent requiring correction as follows: Page 3, first column, line 30-35, claim 1, strike out the formula and insert instead the following—

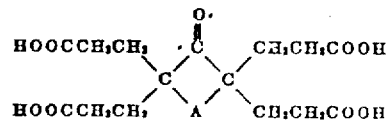

and second column, line 16-17, claim 5, for "conpleting" read *completing*; and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*